(12) United States Patent
Stepanov et al.

(10) Patent No.: US 7,149,384 B2
(45) Date of Patent: Dec. 12, 2006

(54) GRATING DESIGN

(75) Inventors: Dimitri Yu Stepanov, Croyden Park (AU); Alexander Buryak, Killara (AU)

(73) Assignee: Redfern Optical Components Pty Ltd., Eveleigh (AU)

( * ) Notice: Subject to any disclaimer, the term of this patent is extended or adjusted under 35 U.S.C. 154(b) by 77 days.

(21) Appl. No.: 10/472,027

(22) PCT Filed: Mar. 15, 2002

(86) PCT No.: PCT/AU02/00307

§ 371 (c)(1),
(2), (4) Date: Mar. 22, 2004

(87) PCT Pub. No.: WO02/075408

PCT Pub. Date: Sep. 26, 2002

(65) Prior Publication Data

US 2004/0146244 A1    Jul. 29, 2004

(30) Foreign Application Priority Data

Mar. 16, 2001 (AU) ........................... PR3789

(51) Int. Cl.
G02B 6/34 (2006.01)
(52) U.S. Cl. ........................................ 385/37
(58) Field of Classification Search ............ 385/37
See application file for complete search history.

(56) References Cited

U.S. PATENT DOCUMENTS

| | | |
|---|---|---|
| 5,710,849 A | 1/1998 | Little et al. |
| 5,832,154 A | 11/1998 | Uetsuka et al. |
| 6,317,539 B1 | 11/2001 | Loh et al. |
| 6,345,135 B1 | 2/2002 | Reid et al. |
| 6,707,967 B1 * | 3/2004 | Rothenberg et al. ......... 385/37 |
| 2003/0086647 A1 * | 5/2003 | Willner et al. ............... 385/37 |
| 2003/0161580 A1 * | 8/2003 | Morin et al. ................. 385/37 |
| 2005/0033787 A1 | 2/2005 | Stepanov et al. ........... 708/400 |

FOREIGN PATENT DOCUMENTS

| | | |
|---|---|---|
| EP | 0955558 A2 | 11/1999 |
| WO | WO 96/24079 | 8/1996 |
| WO | WO 99/22255 | 5/1999 |
| WO | WO 01/22126 A1 | 3/2001 |

OTHER PUBLICATIONS

"An efficient Inverse Scatterin Algorithm for the Design of Non-uniform Fiber Bragg Gratings"; IEEE J. of Quantom Elect. Aug. 1999.*

Skaar, Johannes et al., "On the Synthesis of Fiber Bragg Gratings by Layer Peeling", IEEE Journal of Quantum Electronics, vol. 37, No. 2, Feb. 200, pp. 165-173.

* cited by examiner

Primary Examiner—Frank G. Font
Assistant Examiner—James P. Hughes
(74) Attorney, Agent, or Firm—Morgan, Lewis & Bockius LLP

(57) ABSTRACT

A method of designing a multi-channel grating structure in a waveguide material, the method comprising the step of utilizing a multi-channel grating design function describing an envelope of a refractive index variation defining the multi-channel grating structure in the waveguide material, wherein the multi-channel grating design function deviates from a periodic sampling function multiplied by a single channel grating design function.

20 Claims, 6 Drawing Sheets

GRATING DESIGN

FIELD OF THE INVENTION

The present invention relates broadly to a multi-channel grating design method and to a multi-channel grating structure.

BACKGROUND OF THE INVENTION

Multi-channel grating structures are typically written into photosensitive waveguides. The grating structure comprises a refractive index variations created in the photosensitive waveguide, which in turn determine the optical characteristics such as the reflection and transmission characteristics of the resulting grating structure.

The envelope of the refractive index variation for a multi-channel grating structure is typically created by applying a sampling, i.e. periodic, function to a given single-channel grating design function. The single-channel grating profile is then typically an envelope of the refrcative index variations achieved by exposing the photosensitive waveguide through a suitable phasemask or using other interferometric techniques.

In a vast majority of previously reported work on multi-channel gratings, a so-called Sinc-sampled design has been used. For the Sinc-sampling approach, an N-channel grating design can be obtained by a direct in-phase summation of N identical seeding gratings [with $\kappa(z)$—amplitude grating amplitude, $\theta(z)$—grating phase] equally spaced in the frequency space:

$$\sum_{l=1}^{N} \kappa e^{i[K_0 z + \theta + (2l-N-1)\Delta k z/2]} = \kappa Q_{Sinc} e^{i(K_0 z + \theta)}, \quad (1)$$

where $$Q_{Sinc} = \sum_{l=1}^{N} \cos[(2l - N - 1)\Delta k z/2]$$

$$= N \sum_{n=-\infty}^{+\infty} \mathrm{sinc}[N(\Delta kz - 2\pi n)/2],$$

$$\mathrm{sinc}(x) \equiv \sin(x)/x,$$

and $\Delta k$ is the channel spacing.

This design will be referred to as "in-phase" grating design herein after by the applicant.

An example of this design is shown in FIGS. 4(c) and (d) with corresponding spectral characteristics as shown in FIGS. 4(a) and (b). The maximum value of the refractive index change required to implement this multi-channel grating design is given by a simple expression:

$$\Delta n_N^{(max)} = N \Delta n_s, \quad (2)$$

where $\Delta n_s$ is the maximum refractive index change required for the single seeding grating. Since any photosensitive fiber used to fabricate Bragg gratings has material limits of the maximum achievable photoinduced refractive index change $\Delta n_N$ this represents a limitation on the maximum number of channels that can be recorded in a given fiber. Thus it is highly desirable to reduce a required $\Delta n_N$ as much as possible. Also it is easy to see that in the chosen example (see FIG. 4) the substantial deviations from the desired (square-like in transmission; linear in group delay) spectral characteristics are present. It has been found that such deviations are always present, albeit to different degrees, if a strictly periodic sampling function approach is used.

In another approach, one may solve an inverse scattering problem for a multi-channel grating directly (i.e. without calculating a single channel seeding profile first and then applying a sampling function). An example is given in FIGS. 5(a)–(d). As can be seen, the spectral characteristics are substanially perfect, but $\Delta n_N$ is poorly optimised.

At least preferred embodiments of the present invention seek to provide an alternative multi-channel grating design in which (i) the maximum refractive index change required as a function of the number of channels is reduced when compared with the prior art grating designs discussed above and (ii) the resulting multi-channel gratings exhibit substantially a desired shape, e.g. square-like shape, in their transmission co-efficient characteristics.

SUMMARY OF THE INVENTION

In accordance with a first aspect of the present invention there is provided a method of designing a multi-channel grating structure in a waveguide material, the method comprising the step of utilising a multi-channel grating design function describing an envelope of a refractive index variation defining the multi-channel grating structure in the waveguide material, wherein the multi-channel grating design function deviates from a periodic sampling function multiplied by a single channel grating design function.

It has been found that the present invention can provide an improved grating design function when compared with prior art methods facilitating design of multi-channel gratings exhibiting a desired spectral characteristics (e.g. square-like shape in transmission and linear dependence in group delay).

In one embodiment, the method comprises calculating the grating design function, and the calculating comprises solving an inverse scattering problem for selected multi-channel spectral response characteristics, wherein each partial (single) channel response function describing one channel of the multi-channel spectral response characteristics includes a phase shift value relative to the response functions of the other channels. Preferably, at least one of the phase shift values is nonzero. In one embodiment, all of the phase shift values are nonzero.

The method may further comprise the step of determining a set of the phase shift values for which an optimisation criterion is met.

The method may comprise the step of determining a set of the phase shift values for which a maximum of the multi-channel grating design function amplitude is minimised.

Alternatively, the method may comprise the step of determining a set of the phase shift values for which a maximum difference between a minimum and a maximum of the multi-channel grating design function amplitude is minimised.

Alternatively, the method may comprise the step of determining a set of the phase shift values for which a mean-square-deviation in the multi-channel grating design function amplitude is minimised.

The step of determining the set of phase shift values may comprise direct scanning through all combinations or conducting a variational analysis, or using other forms of extremum search numerical techniques, or a simulated annealing—Monte Carlo approach.

In another embodiment, the method may comprise the step of determining approximate values for the phase shift values.

The determining of the approximate values may comprise the steps of forming a summation of periodic functions each describing a refractive index variation along the waveguide, wherein each periodic function includes an associated phase shift value relative to the other periodic functions, determining a set of associated phase shift values for which an optimisation criteria is met, and using the set of associated phase shift values as the approximate values.

Preferably, the summation of the periodic functions comprises a Fourier analysis. The result of the Fourier analysis may be expressed as:

$$\sum_{l=1}^{N} \kappa e^{i[K_0 z + \theta + (2l-N-1)\Delta\kappa z/2 + \phi_l]} = \kappa Q e^{i(K_0 z + \theta + \psi)} \quad (3)$$

In one embodiment, the method comprises the step of determining the set of associated phase shift values for which a maximum of the amplitude $Q=Q(z)$ is minimised.

In another embodiment, the method comprises the step of determining the set of associated phase shift values for which a difference between a maximum and a minimum of the amplitude $Q=Q(z)$ is minimised.

In another embodiment, the method comprises the step of determining the set of associated phase shift values for which a mean-square-deviation in the amplitude $Q=Q(z)$ is minimised.

The step of determining the set of associated phase shift values may comprise direct scanning through all combinations or conducting a variational analysis, or using other forms of extremum search numerical techniques, or a simulated annealing—Monte Carlo approach.

The approximate values may be used as the phase shift values to calculate the multi-channel grating design function.

In one embodiment, the method comprises the step of conducting a further optimisation process using the approximate values as seeding values for the phase shift values and using the results of the optimisation process for calculating the multi-channel grating design function.

The grating may be multi-dimensional, wherein the multi-channel grating design function is multi-dimensional.

In accordance with a second aspect of the present invention, there is provided a multi-channel grating structure created utilising the design method defined in the first aspect of the present invention.

In accordance with a third aspect of the present invention there is provided a multi-channel grating structure, wherein an envelope of a refractive index variation defining the multi-channel grating structure deviates from a periodic sampling function multiplied by a single channel grating design function.

BRIEF DESCRIPTION OF THE DRAWINGS

Preferred forms of the present invention will now be described with reference to the accompanying drawings.

DETAILED DESCRIPTION OF THE EMBODIMENTS

Figure 1:
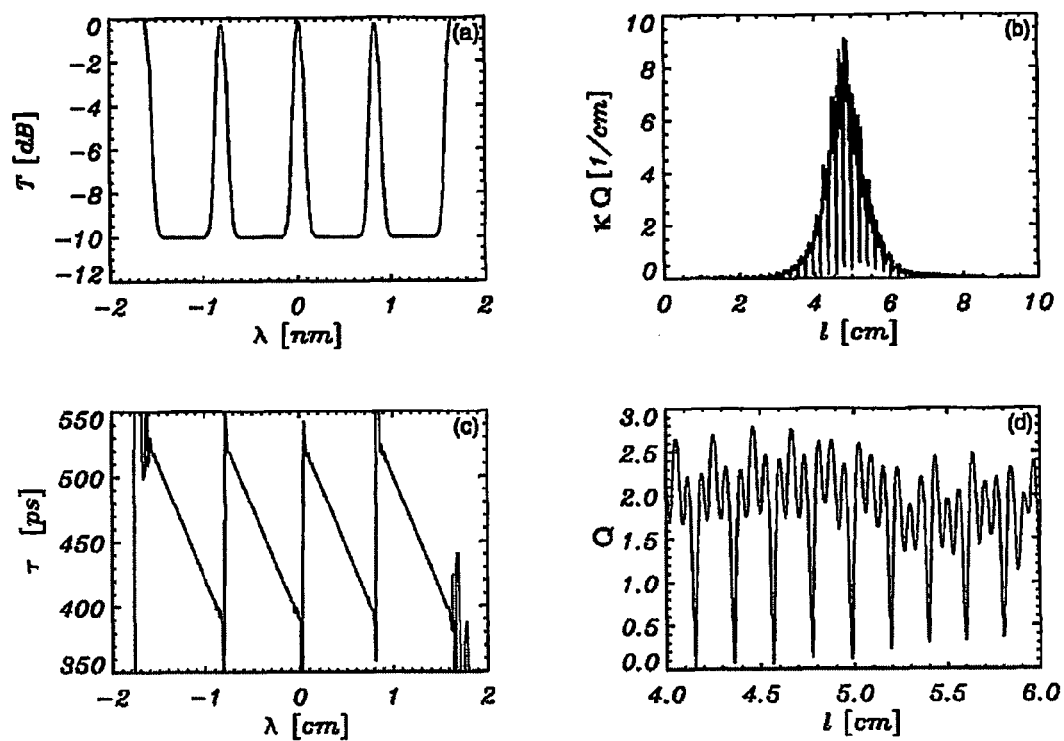
FIGS. 1(a)–(d) show claculated spectral charcateristics and design of a multi channel grating structure emdbodying the present invention.

The preferred embodiment described provides a multi-channel grating design which exhibits desired spectral characteristics (e.g. square-like shape in transmission and linear dependence in group delay) and wherein the maximum refractive index change is less than directly proportional to the number of channels N, thereby improving on prior art multi-channel grating designs.

In the preferred embodiment, a multi-channel grating is constructed by solving the standard inverse scattering problem for multi-channel wavelength-shifted spectral characteristics. This has to be contrasted with prior art designs, in which a single grating design (seeding grating) is utilised to construct (by appling a sampling function) a multi-channel grating.

Importantly, spectral response functions $H_R(\lambda)$ for partial single gratings are being de-phased with respect to each other. In other words the inverse scattering problem may be presented as:

$$H_R^{total}(\lambda) = H_R(\lambda-\lambda_1)e^{i\partial_1} + H_R(\lambda-\lambda_2)e^{i\partial_2} + H_R(\lambda-\lambda_3)e^{i\partial_3} + \quad (4)$$

with nonzero relative phases $\partial_i$ in the preferred embodiment. It is to be noted that spectral responses are being de-phased, not partial seeding gratings themselves. After solving the inverse scattering problem for $H_R^{total}(\lambda)$ the multi-channel grating design function is obtained and may be presented in a form:

$$q(z) = \kappa Q e^{i(K_0 z + \theta + \psi)} \quad (5)$$

where we explicitly retain, for illustrative purposes, the single channel grating design function $\kappa e^{i(K_0 z + \theta)}$. The remaining factors in the expression (5) represent a "sampling" function, which is aperiodic. It is thus not a sampling, i.e. periodic, function anymore, but deviates from a sampling function. This has been found to reduce coupling of light into cladding modes in the resulting grating design.

It will be appreciated by a person skilled in the art that in order to optimise the grating design for minimum refractive index change $\Delta n_N$ as a function of the number of channels N, suitable numerical or analytical methods can be applied.

For relatively small number of channels N one can numerically scan through possible combinations of relative phases $\propto_i$ (solving an inverse scattering problem for each particular combination of dephasing angles $\partial_i$) and selecting the combination which is optimal according to some specific selection criterion (e.g. selecting the combination which minimises maximum required refractive index change).

For N>>1 location of the optimal set $\partial_i$ is difficult. Even rough direct scanning through all possible sets of angles (followed by efficient numerical minimum search routines) quickly becomes numerically inefficient.

To solve the optimization problem for large N we use, in an example embodiment, the so-called simulated annealing method—a Monte Carlo approach for minimization of multi-variable functions. This statistical method samples the search space in such a way that there is a high probability of finding an optimal or a near-optimal solution in a reasonable time. The term "simulated annealing" is derived from the analogy to physical process of heating and then slowly cooling a substance to obtain a crystalline structure. To start, the system state is initialized. A new configuration is constructed by imposing a random displacement. If the energy of the new state is lower than that of the previous one, the change is accepted and the system is updated. If the energy is greater, the new configuration is accepted with some probability. This procedure allows the system to move consistently towards lower energy states, yet still jump out of local minimal due to the probabilistic acceptance of some upward moves.

Another approach is to use the approximate equivalence between partial spectra dephasing angles $\partial_i$ and partial grating relative phases $\phi_i$. Indeed, for weak gratings the first order Born approximation holds:

$$-\frac{1}{2}q(z/2) = \int_{-\infty}^{+\infty} r(\beta)\exp(-i\beta z)d\beta, \quad (6)$$

where $q(z)$ is a grating design function and $r(\beta)$ is a complex reflection coefficient.

The Fourier transform (6) is a linear operation with a major property $F(a_1 r^{(1)} + a_2 r^{(2)}) = a_1 F r^{(1)} + a_2 F r^{(2)}$. Thus, in this approximation, dephasing of partial gratings is equivalent to dephasing of partial spectral channel responses. Formally the last statement does not hold beyond weak grating limit. However, in practice, it is still approximately correct and the optimal set of angles $\phi_i$ (for dephasing of partial gratings) may be used as a very good approximation for the optimal set of partial spectral channel angles $\partial_i$.

Therefore, the phase shift values $\partial_i$ may be taken from an other de-phasing grating design method, which is described in Patent Co-operation Treaty (PCT) patent application No. PCT/AU02/00160 filed on 15 Feb. 2002, entitled "Multi Channel Grating Design" assigned to the present applicant.

For example, in partial seeding grating dephasing described in that applicaition, a sampling function which periodically modulates the amplitude of a given single-channel grating (seeding grating) is utilised, similar to prior art multi-channel grating designs. However, in addition to the periodic modulation of the amplitude of the seeding grating, different relevant phases $\phi_l$ for each of the wavelength-seeding gratings are introduced. Accordingly, the resulting design function in the preferred embodiment maybe expressed as:

$$\sum_{l=1}^{N} \kappa e^{i[K_0 z + \theta + (2l-N-1)\Delta\kappa z/2 + \phi_l]} = \kappa Q e^{i(K_0 z + \theta + \psi)} \quad (7)$$

where the additional phase of the grating $\psi = \psi(z)$ and the sampling amplitude $Q = Q(z)$ are given by:

$$Q^2(z) = 4\sum_{l,p=1}^{N/2} \cos(\alpha_l - \alpha_p)\cos(n_l \Delta k z/2 + \beta_l)\cos(n_p \Delta k z/2 + \beta_p),$$

and $$\psi(z) = \tan^{-1}\left[\frac{\sum_{l=1}^{N/2} \sin\alpha_l \cos(n_l \Delta k z/2 + \beta_l)}{\sum_{l=1}^{N/2} \cos\alpha_l \cos(n_l \Delta k z/2 + \beta_l)}\right], \quad N \text{ is even}$$

or $$Q^2(z) = 4\sum_{l=1}^{(N-1)/2} \cos\alpha_l \cos(n_l \Delta k z/2 + \beta_l) +$$

$$4\sum_{l,p=1}^{(N-1)/2} \cos(\alpha_l - \alpha_p)\cos(n_l \Delta k z/2 + \beta_l)\cos(n_p \Delta k z/2 + \beta_p) + 1,$$

and $$\psi(z) = \tan^{-1}\left[\frac{\sum_{l=1}^{(N-1)/2} \sin\alpha_l \cos(n_l \Delta k z/2 + \beta_l)}{\sum_{l=1}^{(N-1)/2} \cos\alpha_l \cos(n_l \Delta k z/2 + \beta_l + 1)}\right], \quad N \text{ is odd,}$$

where $n_l \equiv 2l-N-1$ and $n_p \equiv 2p-N-1$.

In the above expressions for $Q(z)$ and $\psi(z)$ we use notations $\alpha_l \equiv (\phi_l + \phi_{N+1-l})/2, \beta_l \equiv (\phi_l - \phi_{N+1-l})/2$ and set $\phi_{(N+1)/2} = 0$ for odd number of channels. Now for any given $N$ there will be a set of $\{\alpha_l\}$, $\{\beta_l\}$ (or equivalently a set of $\{\phi_l\}$) which minimizes the maximum value of $Q$ along the grating structure. By direct calculations it is straightforward to show that $$\int_0^{2\pi/\Delta k} Q^2 dz = 2\pi N/\Delta k, \quad (8)$$

for any choice of $\alpha_l$ and $\beta_l$. This expression, in turn, leads to an asymptotic formula for the minimum possible $\Delta n_N$ corresponding to an "ideal" situation when $Q(z) = \sqrt{N}$ and only phase $\psi(z)$ is nontrivially modulated:

$$\Delta n_N = \sqrt{N} \Delta n_s. \quad (9)$$

We note, that, in practice, the limit $Q(z) = \sqrt{N}$ can be reached only approximately.

Mathematically, one should solve a minimax problem and find $Q_{mm}(z; \alpha_l^{(opt)}, \beta_l^{(opt)})$ for which $\max_z \{Q_{mm}(z; \alpha_l^{(opt)}, \beta_l^{(opt)})\} = \min_{(\alpha,\beta)} \max_z \{Q(z; \alpha_l, \beta_l)\}$. To find the optimal set $\phi_l$ for a relatively small number of channels one may use direct numerical scanning through all possible combinations of the dephasing angles.

For $N \gg 1$ location of the minimizing set $(\alpha_l^{(opt)}, \beta_l^{(opt)})$ is a nontrivial exercise. Again we suggest to use the simulated annealing method.

The above described $Q_{mm}(z)$ reduction strategy does not include trying to avoid touching the zero level at some z. However, zeros in the fibre Bragg grating (FBG) amplitude may lead to the increased phase errors (appearance of phase jumps) and should be avoided. Thus, arguably, a better minimization strategy is minimizing its maximum deviations of $Q(z)$ along z from the theoretical limit level of $\sqrt{N}$. Mathematically this may be formulated as finding $Q_{dm}(z; \alpha_l^{(opt)}, \beta_l^{(opt)})$ for which $$\max_z \{Q_{dm}(z; \alpha_l^{(opt)}, \beta_l^{(opt)})\} - \min_z \{Q_{dm}(z; \alpha_l^{(opt)}, \beta_l^{(opt)})\} =$$
$$\min_{\alpha_l, \beta_l} [\max_z \{Q(z; \alpha_l, \beta_l)\} - \min_z \{Q(z; \alpha_l, \beta_l)\}]$$

This approach may be implemented by using the same simulated annealing algorithm described above.

Another approach will now be described, in which optimization by the functional minimisation (variational approach) is utilised. The key property of this embodiment is that it relies on estimate of some integral functional rather than time-consuming numerical scanning in z. Quantitatively, proximity of Q(z) to the theoretical limit $\sqrt{N}$ can be characterised by mean-square-deviation, $$\Delta Q = \sqrt{\langle (Q(z) - \overline{Q})^2 \rangle}, \quad (10)$$

where $$\langle f(z) \rangle \equiv \overline{f} = \Delta k / 2\pi \int_0^{2\pi/\Delta k} f(z) dz$$

Ideal optimisation of Q(z) corresponds to the achievement of the average $\overline{Q} = \sqrt{N}$ and the zero mean-square-deviation from this average value. Using expression (4) and assuming $\overline{Q} \approx \sqrt{N}$, one can show that $$\Delta Q \approx \sqrt{(2-E)E} N, \quad (11)$$

where $$E = \frac{1}{4N^2} \sum_{l=1}^{N} \sum_{\substack{p=1 \\ |l-p| \geq 1}}^{N} \sum_{m=1}^{N-|l-p|} \cos(\alpha_m - \alpha_{m+|l-p|})$$

$$\cos(\alpha_l + \beta_l - \alpha_p - \beta_p + \beta_m - \beta_{m+|l-p|}).$$

For finding minima of ΔQ the most efficient strategy is again the use of the simulated annealing method.

The advantage of the optimisation based on the functional minimisation compared with direct scanning is the speed: integration over z is carried out analytically which saves lots of computer time. For odd number of channels variational optimisation leads to a sampling function without zeros in amplitude (similar to maximum deviations minimisation approach). For even number of channels variational optimisation leads to a sampling function with zeros in amplitude (similar to maximum minimisation approach).

The calculated angles $(\alpha_l^{(opt)}, \beta_l^{(opt)})$ may be used directly for partial spectra dephasing of multi-channel grating designs to derive a multi-channel grating design function embodying the present invention, which deviates from a periodic sampling function multiplied by a single channel grating design function. In an embodiment of the present invention, phase shift values $\phi_l$, (see equation (7)) corresponding to maximum minimisation approach for a four-channel grating design were determined utilising the above optimisation calculations, in which $\alpha_1 = 0.5759\pi$, $\alpha_2 = 0$, and $\beta_1 = \beta_2 = 0$ was chosen.

The phase shift values $\phi_l$ thus determined were then utilised as phase shift values $\partial_l$ for the inverse scattering problem as part of this embodiment of the present invention (see equation (4)). The envelope of the refractive index variation and transmission characteristics are shown in FIGS. 1(b) and 1(a) respectively. It can be seen that the grating design of the preferred embodiment retains all desirable spectral characteristics with an almost absolute accuracy. In FIG. 1(d) the envelope of the refractive index variation of FIG. 1(b) has been normalised to the single channel grating design function used, over a limited range, to illustrate the deviation from a periodic sampling function used in prior art designs. The calculated time-delay characteristics of this embodiment is shown in FIG. 1(c).

Another embodiment of the present invention using partial spectra dephasing of multi-channel grating design (based on difference minimisation approach) is shown in FIGS. 2(a)–(d). The envelope of the refractive index variation and transmission characteristics are shown in FIGS. 2(b) and 2(a) respectively. It can be seen that the grating design of this embodiment also retains all desirable spectral characteristics with an almost absolute accuracy. In FIG. 2(d) the envelope of the refractive index variation of FIG. 2(b) has been normalised to the single channel grating design function used, over a limited range, to again illustrate the deviation from a periodic sampling function used in prior art designs. The calculated time-delay characteristics of this embodiment is shown in FIG. 2(c). All said about the grating design shown in FIG. 1 stays valid, but in addition zeros in grating apodisation profile are avoided.

Figure 4:
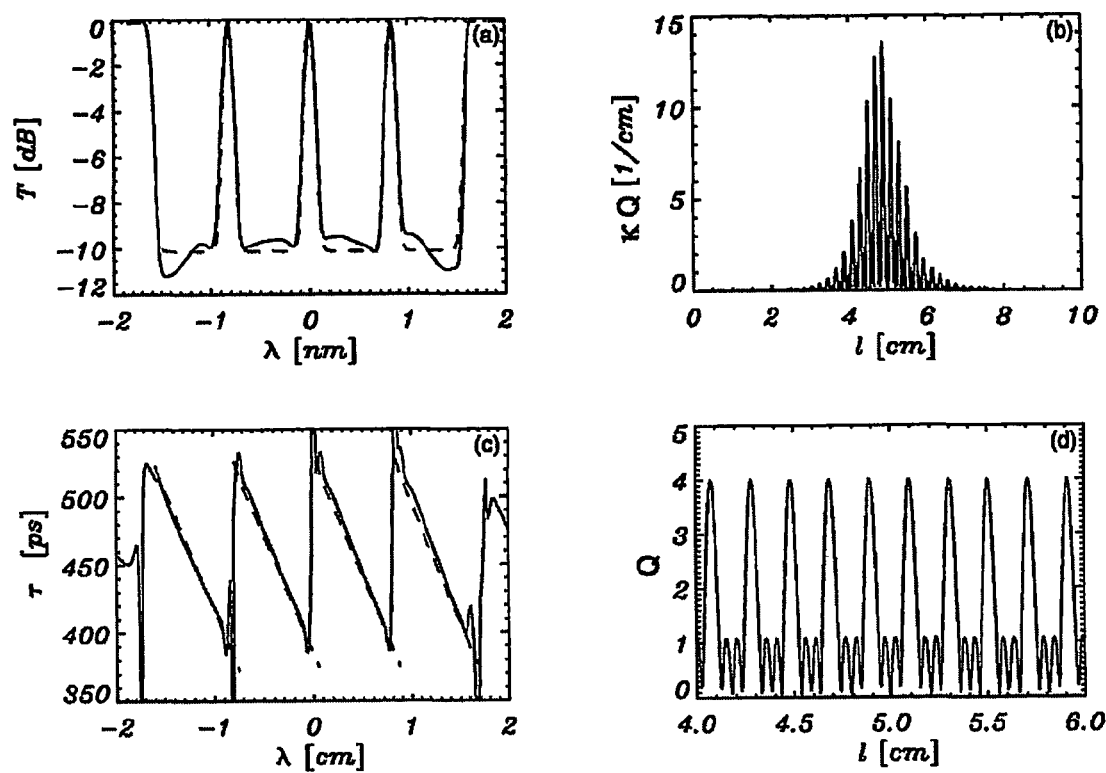
FIGS. 4(a)–(d) show claculated spectral charcateristics and design of a prior art multi channel grating structure.
Figure 5:
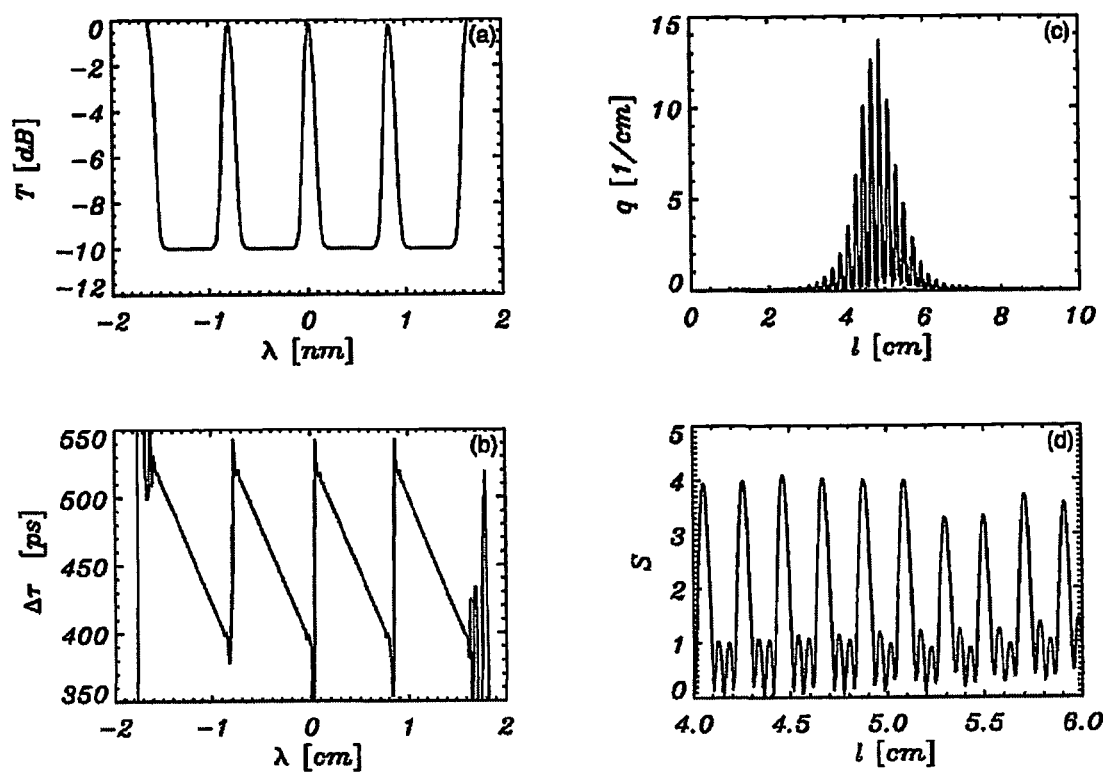
FIGS. 5(a)–(d) show claculated spectral charcateristics and design of a prior art multi channel grating structure.

Both of the designs embodying the present invention provide about 40% reduction in maximum $\Delta n_N$ in comparison with Sinc-sampling or in-phase inverse scattering-based prior art designs (See FIG. 4 or 5) and at the same time have substantially ideal characteristics, similar to in-phase inverse scattering-based prior art designs (see FIG. 5).

It will be appreciated by a person skilled in art that the phase shift values determined utilising the "partial seeding grating dephasing" in the embodiments described above may, in other embodiments, be utilised only as an initial set of phase shift values for solving the inverse scattering problem for the multi-channel wavelength shifted spectral responses. The method of such embodiments then further comprises the step of finetuning of dephasing angles using of the initial set of phase shift values as seeding values. In that way, a grating design is further optimised by further reducing the maximum refractive index of a given grating design (with seeding dephasing values). The standard numerical minimum search techniques (in combination with efficient inverse scattering numerical methods) are utilised for this purpose.

Figure 3:
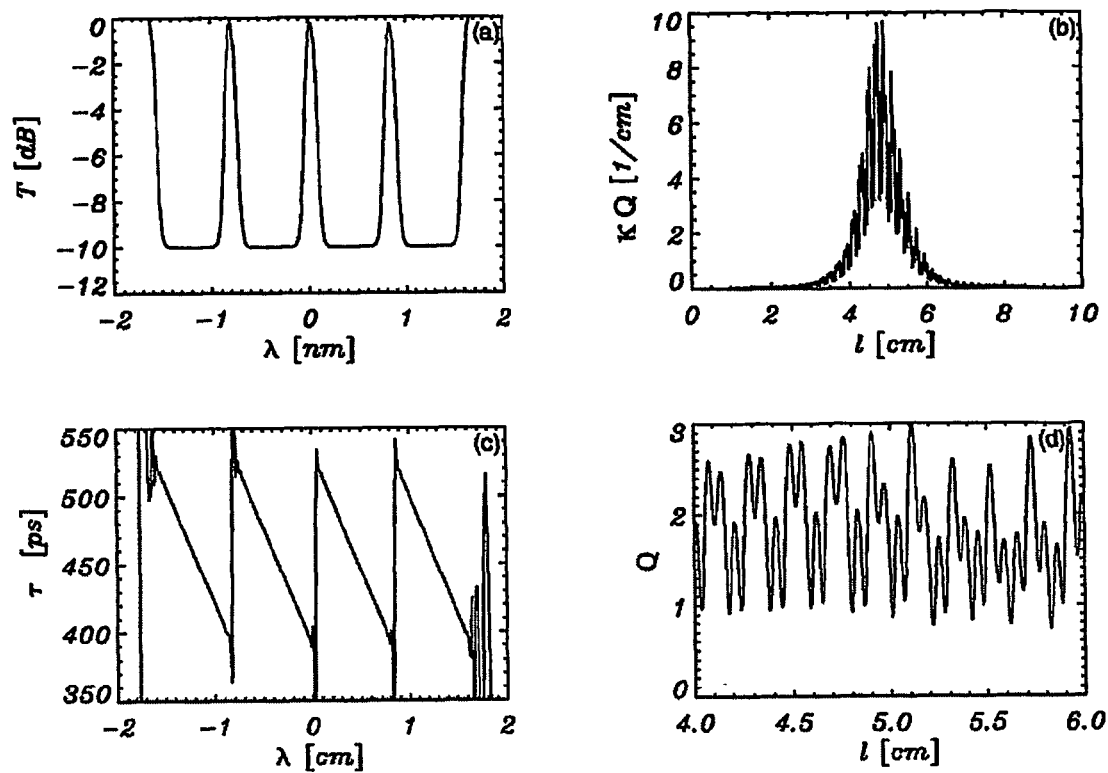
FIGS. 3(a)–(d) show claculated spectral charcateristics and design of another multi channel grating structure emdbodying the present invention.

An example of such a finetuned optimisation embodiment is shown in FIG. 3. The envelope of the refractive index variation and transmission characteristics are shown in FIGS. 3(b) and 3(a) respectively. It can be seen that the grating design of this embodiment again retains all desirable spectral characteristics with an almost absolute accuracy. In FIG. 3(d) the envelope of the refractive index variation has been normalised to the single channel grating design function used, over a limited range, to illustrate the deviation from a periodic sampling function used in prior art designs. The calculated time-delay characteristics of this embodiment is shown in FIG. 3(c). One can see that the maximum refractive index change of this design is slightly (5%) smaller, than the maximum refractive index change of the design shown in FIG. 1. Spectral characteristics still remain as good as for the design of FIG. 1.

Figure 2:
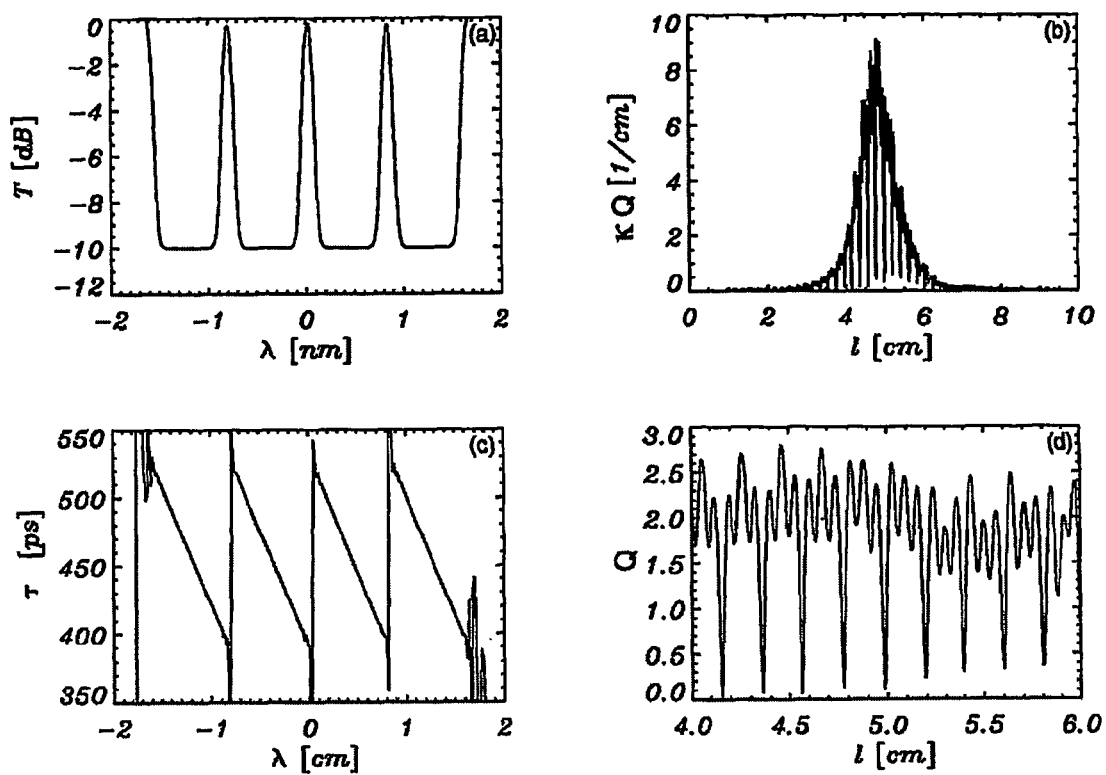
FIGS. 2(a)–(d) show claculated spectral charcateristics and design of another multi channel grating structure emdbodying the present invention.

As can be seen from FIGS. 1 to 3, the implementation of the multi-channel grating design of the preferred embodiment in a grating structure requires grating writing apparatus with high spatial resolution to be utilised. Therefore, in a grating writing apparatus relying on photo induced refractive index changes, the apparatus preferably comprises a beam focusing means to reduce the size of the beam in the core of the photosensitive waveguide.

Figure 6:
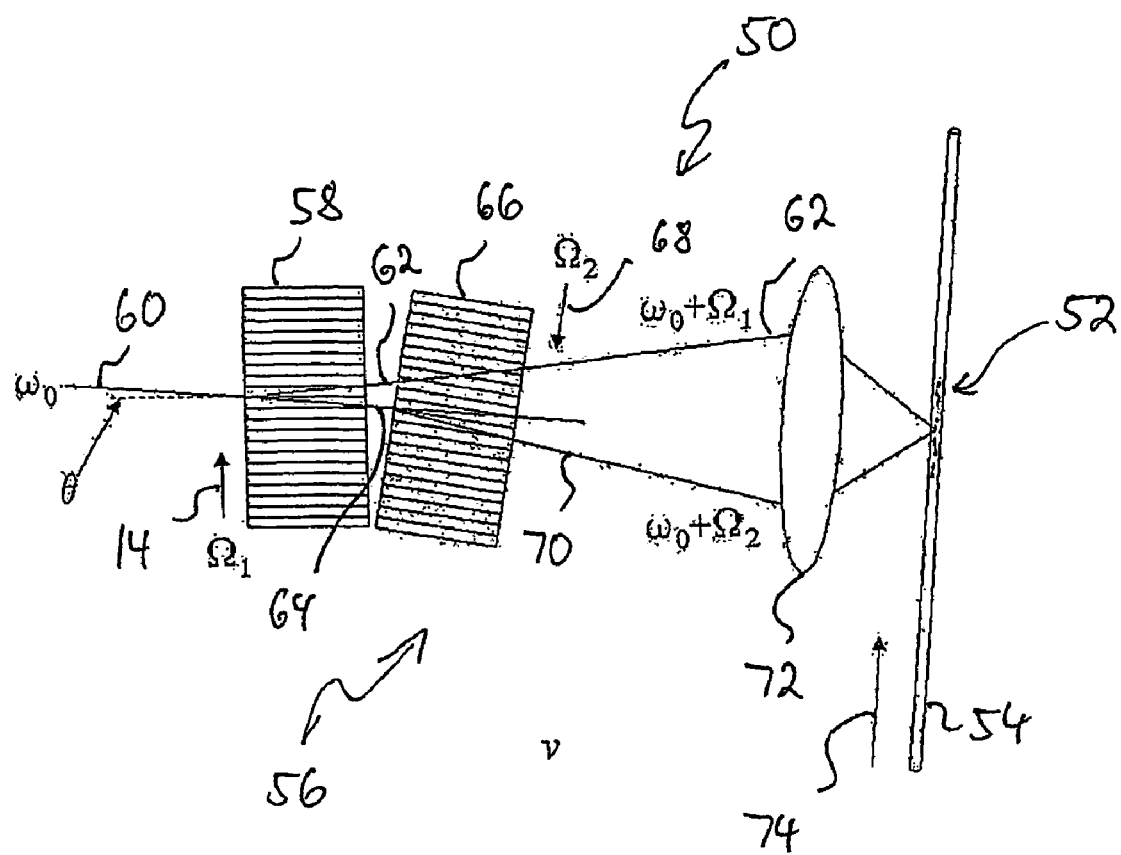
FIG. 6 shows an experimental set up for writing a multi-channel grating structure of a multi-channel grating design embodying the present invention.

FIG. 6 shows an example experimental set up 50 for writing a multi-channel grating 52 into an optical fibre 54. The experimental set up 50 comprises an interferometer 56 which includes a first acousto-optic modulation 58 being operated under an acousto-optic wave of a first frequency $\Omega_1$, as indicated by arrow 14. An incoming light beam 60 is incident on the first acousto-optic modulator 58 under a first order Bragg angle. The operating conditions of the acousto-optic modulator 58 are chosen such that the modulator 58 is under driven, whereby approximately 50% of the incoming beam 60 is diffracted into a first order beam 62, and 50% passing through the acousto-optic modulator 58 as un-diffracted beam 64. The un-diffracted beam 64 is incident on a second acousto-optic modulator 66 of the interferometer 56 under a first order Bragg angle, whereas the beam 62 is not. Accordingly, the beam 62 passing through the second acousto-optic modulator 66 without any significant loss.

The second acousto-optic modulator 66 is operated under an acousto-optic wave of a frequency $\Omega_2$, which propagates in a direction opposed the direction of the acousto-optic wave in the first modulator 58 as indicated by arrow 68. After the second acousto-optic modulator 66 the first order diffracted beam 70 and the beam 62 are frequency shifted in the same direction (e.g. higher frequency), but by different amounts i.e. $\Omega_1$ v $\Omega_2$.

The beams 62, 70 are then brought to interference utilising an optical lens 72, and the resulting interference pattern (at numeral 74) induces refractive index changes in the photosensitive optical fibre 54, whereby a refractive index profile, i.e. grating structure 52, is created in the optical fibre 54.

In FIG. 6, the optical fibre 54 is translated along the interferometer at a speed v, as indicated by arrow 74.

It will be appreciated by a person skilled in the art that the experimental set up 50 shown in FIG. 6 can be utilised to write a multi-channel grating structure of a multi-channel grating design embodying the present invention through suitable control of the first and second acousto-optic modulators 58, 66, in conjunction with a suitable control of the speed v at which the optical fibre 54 is translated along the interferometer 56 at any particular time. The high spatial resolution required to implement the multi-channel design of the preferred embodiment is achieved in the set up shown in FIG. 6 by utilising optical lens 72, with the practical limit of the beam size in the focal plane preferably being of the order of the waveguide core size.

It will be appreciated by a person skilled in the art that numerous variations and/or modifications may be made to the present invention as shown in the specific embodiments without departing from the spirit of scope of the invention as broadly described. The present embodiments are, therefore, to be considered in all respects to be illustrative and not restrictive.

For example, multi-channel gratings can be created on the basis of the multi-channel grating design of the present invention using various known grating creation techniques, including one or more of the group of photo-induced refractive index variation in photo sensitive waveguide materials, etching techniques including etching techniques utilising a phasemask, and epitaxial techniques.

In the claims that follow and in the summary of the invention, except where the context requires otherwise due to express language or necessary implication the word "comprising" is used in the sense of "including", i.e. the features specified may be associated with further features in various embodiments of the invention.

The invention claimed is:

1. A method of designing a multi-channel grating structure with multi-channel spectral response characteristics in a waveguide material, the method comprising:
   utilising an aperiodic multi-channel grating design function describing an envelope of a refractive index variation defining the multi-channel grating structure in the waveguide material, the design function being a solution to an inverse scattering problem for the multi-channel spectral response characteristics as described by more than one partial single channel response function, each partial single channel response function describing one channel of the multi-channel spectral response characteristics and at least one of the partial single channel response functions being phase shifted relative to the other partial single channel response functions.

2. A method as claimed in claim 1, wherein the method further comprises providing the multi-channel grating design function by solving an inverse scattering problem for multi-channel spectral response characteristics as described by more than one partial single channel response function, each partial single channel response function describing one channel of the multi-channel spectral response characteristics and at least one partial single channel response function being phase shifted relative to the other partial single channel response functions.

3. A method as claimed in claim 2, wherein each of the partial single channel response functions are phased shifted relative to the other partial single channel response functions.

4. A method as claimed in claim 1, wherein the method further comprises the step of determining phase shifts of the partial single channel response functions for which an optimisation criterion is met.

5. A method as claimed in claim 4, wherein the method further comprises determining phase shifts for which a maximum amplitude of the multi-channel grating design function is minimised.

6. A method as claimed in claim 4, wherein the method further comprises determining phase shifts for which a maximum difference between a minimum amplitude and a maximum amplitude of the multi-channel grating design function is minimised.

7. A method as claimed in claim 4, wherein the method further comprises determining phase shifts for which a mean-square-deviation of the amplitude of the multi-channel grating design function is minimised.

8. A method as claimed in claim 4, wherein the determining the phase shifts comprises at least one of:
   direct scanning through all combinations;
   conducting a variational analysis;
   using extremum search numerical techniques; and
   a simulated annealing—Monte Carlo approach.

9. A method as claimed in claim 1, wherein the method further comprises determining approximate values for the phase shifts.

10. A method as claimed in claim 9, wherein the determining of the approximate values comprises:
    forming a periodic sampling function by summation of periodic functions each describing a refractive index variation along the waveguide, wherein at least one periodic function includes an associated periodic function phase shift relative to the other periodic functions;

determining associated periodic function phase shifts for which an optimisation criteria is met; and using the associated periodic function phase shifts as the approximate phase shifts.

11. A method as claimed in claim 10, wherein the summation of the periodic functions comprises a Fourier analysis.

12. A method as claimed in claim 11, wherein the result of the Fourier analysis represents a form of the expression:

$$\sum_{l=1}^{N} \kappa e^{i[K_0 z + \theta + (2l-N-1)\Delta \kappa z/2 + \phi_l]} = \kappa Q e^{i(K_0 z + \theta + \psi)}.$$

13. A method as claimed in claim 10, wherein the determining of the associated periodic function phase shifts further comprises determining associated periodic function phase shift values for which a maximum amplitude of the periodic sampling function is minimised.

14. A method as claimed in claim 10, wherein the determining of the associated periodic function phase shifts further comprises determining associated periodic function phase shifts for which a difference between a maximum amplitude and a minimum amplitude of the periodic sampling function is minimised.

15. A method as claimed in claim 10, wherein the determining of the set of associated phase shifts further comprises determining a set of associated phase shifts for which a mean-square-deviation of the amplitude of the periodic sampling function is minimised.

16. A method as claimed in claim 13, wherein the determining of the associated periodic function phase shifts comprises at least one of:
  direct scanning through all combinations;
  conducting a variational analysis;
  using extremum search numerical techniques; and
  a simulated annealing—Monte Carlo approach.

17. A method as claimed in claim 10, wherein the periodic function phase shifts are used as the phase shifts to calculate the multi-channel grating design function.

18. A method as claimed in claim 10, wherein the method comprises conducting a further optimisation process using the periodic function phase shifts as seeding values for the phase shifts and using the results of the optimisation process for calculating the multi-channel grating design function.

19. A method as claimed in claim 1, wherein the grating is multi-dimensional, and wherein the multi-channel grating design function is multi-dimensional.

20. A multi-channel grating structure created utilising the design method as claimed in claim 1.

* * * * *